(12) United States Patent
Nakahata

(10) Patent No.: US 8,144,381 B2
(45) Date of Patent: Mar. 27, 2012

(54) OPTICAL SYSTEM, IMAGE FORMING APPARATUS, AND CONTROL METHOD THEREOF

(75) Inventor: Hiroshi Nakahata, Abiko (JP)

(73) Assignee: Canon Kabushiki Kaisha (JP)

( * ) Notice: Subject to any disclaimer, the term of this patent is extended or adjusted under 35 U.S.C. 154(b) by 640 days.

(21) Appl. No.: 12/326,505

(22) Filed: Dec. 2, 2008

(65) Prior Publication Data

US 2009/0141328 A1 Jun. 4, 2009

(30) Foreign Application Priority Data

Dec. 4, 2007 (JP) ................................. 2007-313941

(51) Int. Cl.
*G02B 26/08* (2006.01)

(52) U.S. Cl. .................. 359/216.1; 359/201.2; 250/234; 347/261

(58) Field of Classification Search .... 359/201.1–202.1, 359/216.1–219.2, 204.1–204.5; 347/232–233, 347/243, 259–261; 250/234–236
See application file for complete search history.

(56) References Cited

U.S. PATENT DOCUMENTS

| 5,115,256 A | 5/1992 | Miyagi et al. |
| 5,903,378 A * | 5/1999 | Takano et al. ............... 359/201.1 |
| 2007/0064088 A1 * | 3/2007 | Izumiya ........................ 347/261 |

FOREIGN PATENT DOCUMENTS

| JP | 64-73369 A | 3/1989 |
| JP | 7-151987 A | 6/1995 |
| JP | 9-230273 A | 9/1997 |

* cited by examiner

*Primary Examiner* — James Phan
(74) *Attorney, Agent, or Firm* — Rossi, Kimms & McDowell LLP

(57) ABSTRACT

An image forming apparatus performs multi-color image formation using a plurality of scanning type optical devices which deflect and scan an optical beam using a rotating polygonal mirror. The image forming apparatus includes, for example, a detecting unit that detects a phase of rotating speed unevenness of rotating polygonal mirrors respectively provided in the plurality of scanning type optical devices, and an adjusting unit that adjusts, based on a phase of rotating speed unevenness detected for each rotating polygonal mirror, the rotating speed of each rotating polygonal mirror to reduce the phase differences between the phases.

21 Claims, 10 Drawing Sheets

FIG. 6
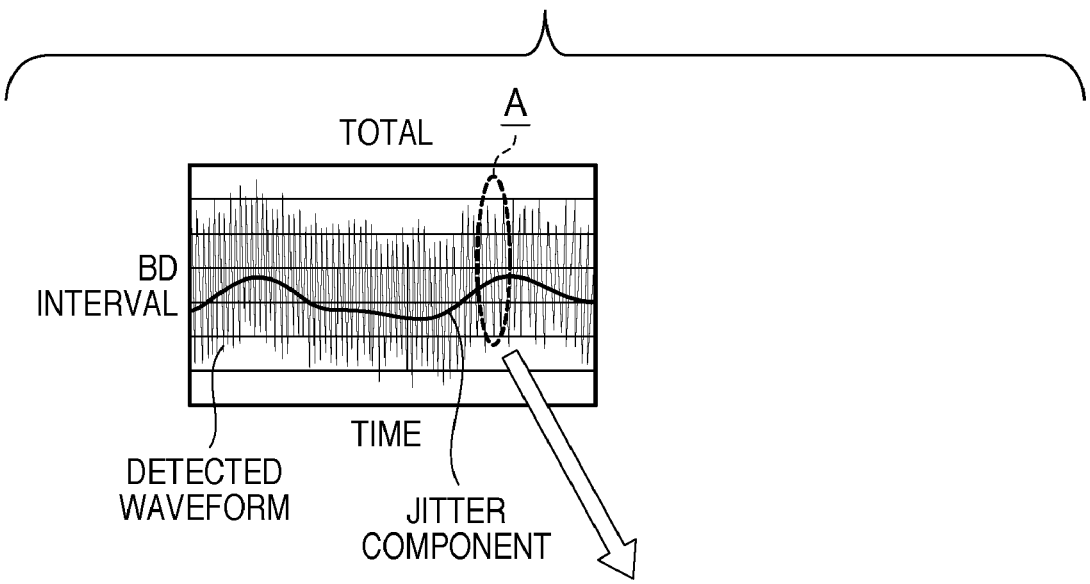
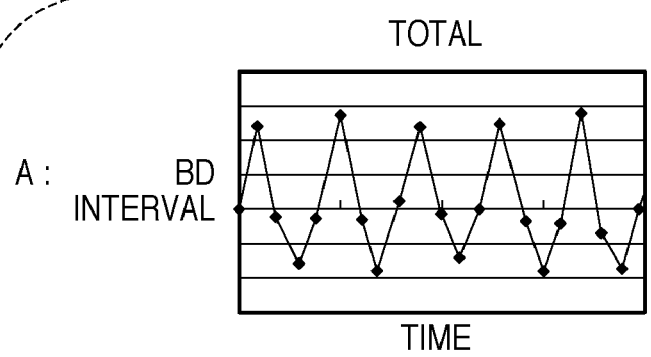
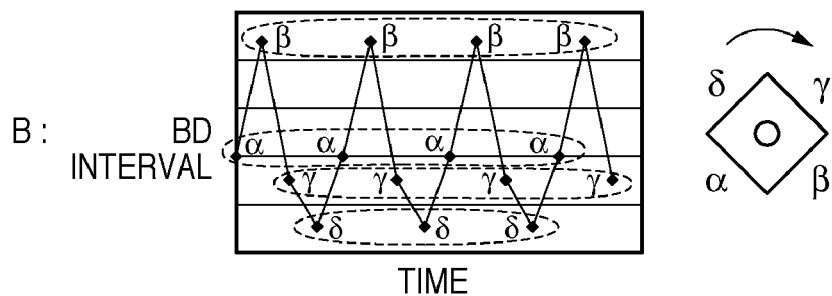

FIG. 7
DETECTED WAVEFORM AND JITTER COMPONENT
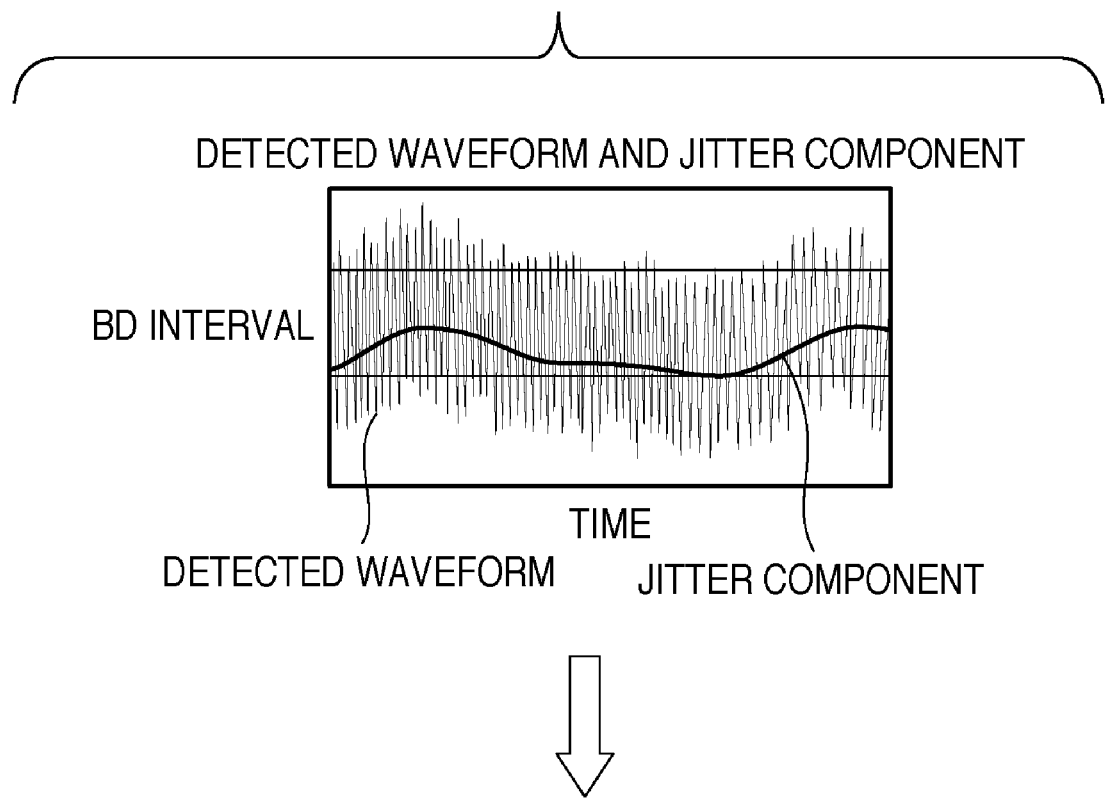
EXTRACTION RESULT OF LONG CYCLE JITTER
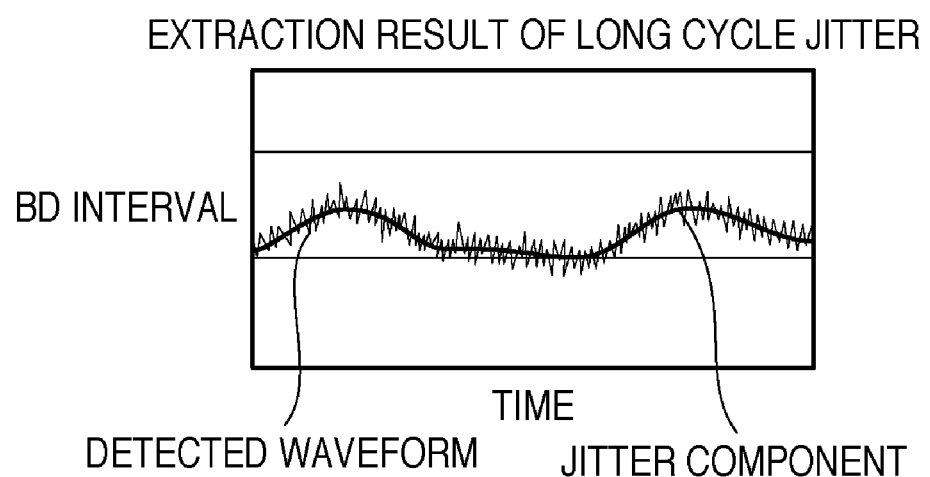

OPTICAL SYSTEM, IMAGE FORMING APPARATUS, AND CONTROL METHOD THEREOF

BACKGROUND OF THE INVENTION

1. Field of the Invention

The present invention relates generally to an optical system, and more particularly, to an image forming apparatus including a plurality of scanning type optical devices which deflect and scan an optical beam with a rotating polygonal mirror and a control method of the image forming apparatus.

2. Description of the Related Art

Generally, an image forming apparatus that uses a plurality of image carrier bodies to form a multi-color image accomplishes this by overlapping toner images of different colors formed on the respective image carrier bodies. When forming a latent image to be developed into a toner image on each image carrier body, a plurality of exposure apparatuses deflect and scan an optical beam on each image carrier body using a polygonal mirror.

Image quality in a multi-color image forming apparatus is affected by so-called color misalignment or color misregistration. A color misalignment occurs when a forming position of a toner image of each color deviates from a reference position. For example, when unevenness (hereinafter referred to as a jitter) occurs in the rotating speed of a scanner motor for driving a polygonal mirror, a fluctuation in magnification occurs, causing a color misalignment in a main scanning direction. The color misalignment is less noticeable on a scanning line writing-side (scanning start side) and more noticeable on an image end-side (scanning end-side).

Jitters include "short cycle jitters" with relatively short cycles and "long cycle jitters" with relatively long cycles. A short cycle jitter is primarily caused by variations in the accuracy of surface of a reflecting surface of a polygonal mirror and residual errors in rotational control of a scanner motor. Meanwhile, a long cycle jitter is primarily caused by residual errors in control and air current variations in association with the rotation of the polygonal mirror.

FIG. 12 is a diagram for describing the relationship between a signal waveform of a jitter component having a relatively large amplitude among jitters of a scanner motor and a color misalignment in a main scanning direction. In this case, it is assumed that four respectively independent exposure apparatuses corresponding to black, cyan, magenta, and yellow are to be used. Since each exposure apparatus has a different exposure start timing and performs rotating speed control independently, the phases of the jitter components of the respective exposure apparatuses are different. Consequently, a deviation in the exposure position (image forming position) occurs at an image end side of each exposure apparatus, which in turn causes a color misalignment. An image forming device that renders different colors by overlapping a plurality of different-colored toners assumes that the formation positions of the toner images in the respective colors used in the superposition are consistent. Therefore, unless the formation positions of the toner images in the respective colors used in the superposition are consistent, not only is it impossible to render an intended color but a color misalignment occurs in which, for example, a used toner color becomes undesirably prominent.

Japanese Patent Laid-Open No. 07-151987 proposes an invention that reduces long cycle jitters by covering the periphery of a polygonal mirror with a cylindrical cover to suppress crosscurrent vortex.

The invention according to Japanese Patent Laid-Open No. 07-151987 is truly remarkable in that long cycle jitters attributable to crosscurrent vortex can be reduced. However, there is a limit as to how much air current can be rectified. The distance between a cylindrical guide section that rectifies air current and the polygonal mirror is shortest at edge portions and longest at the center of adjacent edges. Therefore, air pulsation is unavoidable. Although it is possible, in principle, to eliminate air pulsation by vacuumizing the periphery, creating a vacuum state is extremely difficult from both cost and technical perspectives.

SUMMARY OF THE INVENTION

In consideration thereof, an object of the present invention is to solve at least one of the aforementioned and other problems. For example, an object of the present invention is to further reduce the amount of color misalignment attributable to long cycle jitters.

For example, the present invention can be applied to an image forming apparatus that performs multi-color image formation using a plurality of scanning type optical devices which deflect and scan an optical beam with a rotating polygonal mirror. The image forming apparatus includes, for example, a detecting unit that detects a phase of rotating speed unevenness of rotating polygonal mirrors respectively provided in the plurality of scanning type optical devices, and an adjusting unit that adjusts, based on a phase of rotating speed unevenness detected for each rotating polygonal mirror by the detecting unit, the rotating speed of each rotating polygonal mirror to reduce the phase differences between the phases.

Further features of the present invention will become apparent from the following description of exemplary embodiments (with reference to the attached drawings).

BRIEF DESCRIPTION OF THE DRAWINGS

FIG. 6 is a diagram showing examples of data of detected BD intervals and a jitter component extraction method according to the present embodiment;

FIG. 7 is a diagram for describing the effects of frequency extraction according to the present embodiment;

DESCRIPTION OF THE EMBODIMENTS

Embodiments of the present invention will now be described. The individual embodiments described below should prove useful towards understanding various concepts including superordinate concepts, mid-level concepts, and subordinate concepts of the present invention. In addition, it is to be understood that the technical scope of the present invention is defined by the appended claims and is not limited to the individual embodiments described below.

Figure 1:
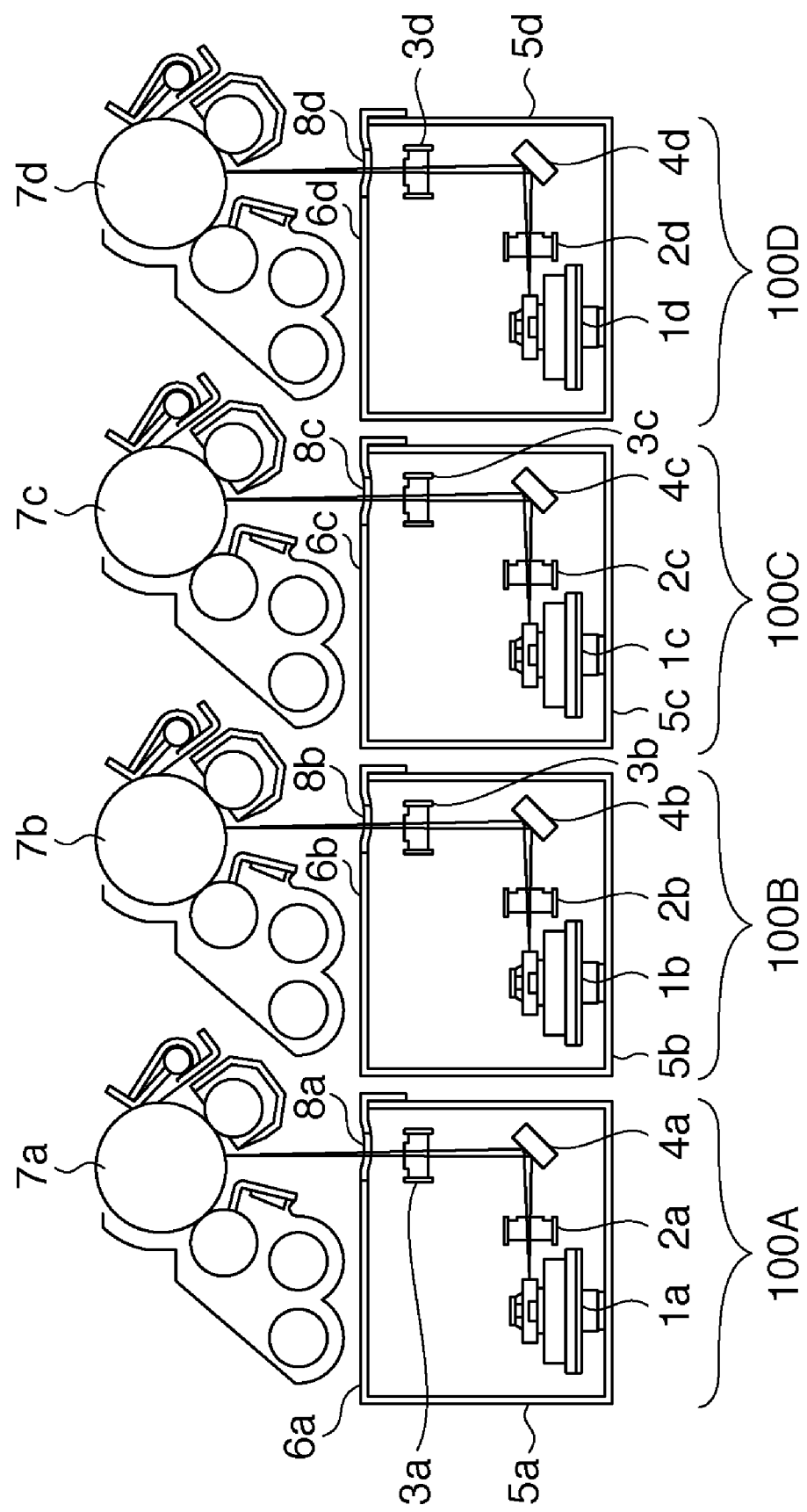
FIG. 1 is a diagram showing a portion of an image forming apparatus that performs multi-color image formation according to an embodiment.

FIG. 1 is a diagram showing a portion of an image forming apparatus that performs multi-color image formation according to an embodiment. Scanning type optical devices 100A to 100D and photoconductive drums 7a to 7d are disposed in an image forming unit shown in FIG. 1. A sort of an optical system is formed by the scanning type optical devices 100A to 100D. Hereinafter, the subscripts A to D and a to d affixed to reference characters may sometimes be omitted when describing a common element.

The photoconductive drums 7a to 7d are examples of an image carrier body. The plurality of scanning type optical devices irradiates an optical beam to respectively corresponding photoconductive drums while deflecting and scanning an optical beam using rotating polygonal mirrors. A scanning type optical device may alternatively be referred to as, for example, an exposure apparatus, a light scanning device, an optical scanning device, a scanner device, or the like.

According to FIG. 1, four scanning type optical devices respectively corresponding to different colors are provided. Each scanning type optical device is provided with scanner motors 1a to 1d, fθ lenses 2a to 2d and 3a to 3d, folding mirrors 4a to 4d, optical boxes 5a to 5d, and upper lids 6a to 6d. The scanner motors 1a to 1d are examples of a rotating polygonal mirror and deflect and scan a laser light emitted based on image information. The laser light is an example of an optical beam. The fθ lenses 2a to 2d and 3a to 3d are optical parts that are scanned on a photoconductive drum at a constant speed by a laser light and which focus the laser light as a spot. The folding mirrors 4a to 4d are optical parts that reflect a laser light in the direction of a photoconductive drum. The optical boxes 5a to 5d are chassis for assembling the respective optical parts. The optical boxes 5a to 5d are shielded from the outside by the upper lids 6a to 6d. The upper lids 6a to 6d are provided with apertures that allow passage of a laser light for exposing the surfaces of the photoconductive drums 7a to 7d. Pieces of dust-proof glass 8a to 8d that allow laser light to pass while protecting the scanning type optical devices from dust are attached to the apertures.

Figure 2:
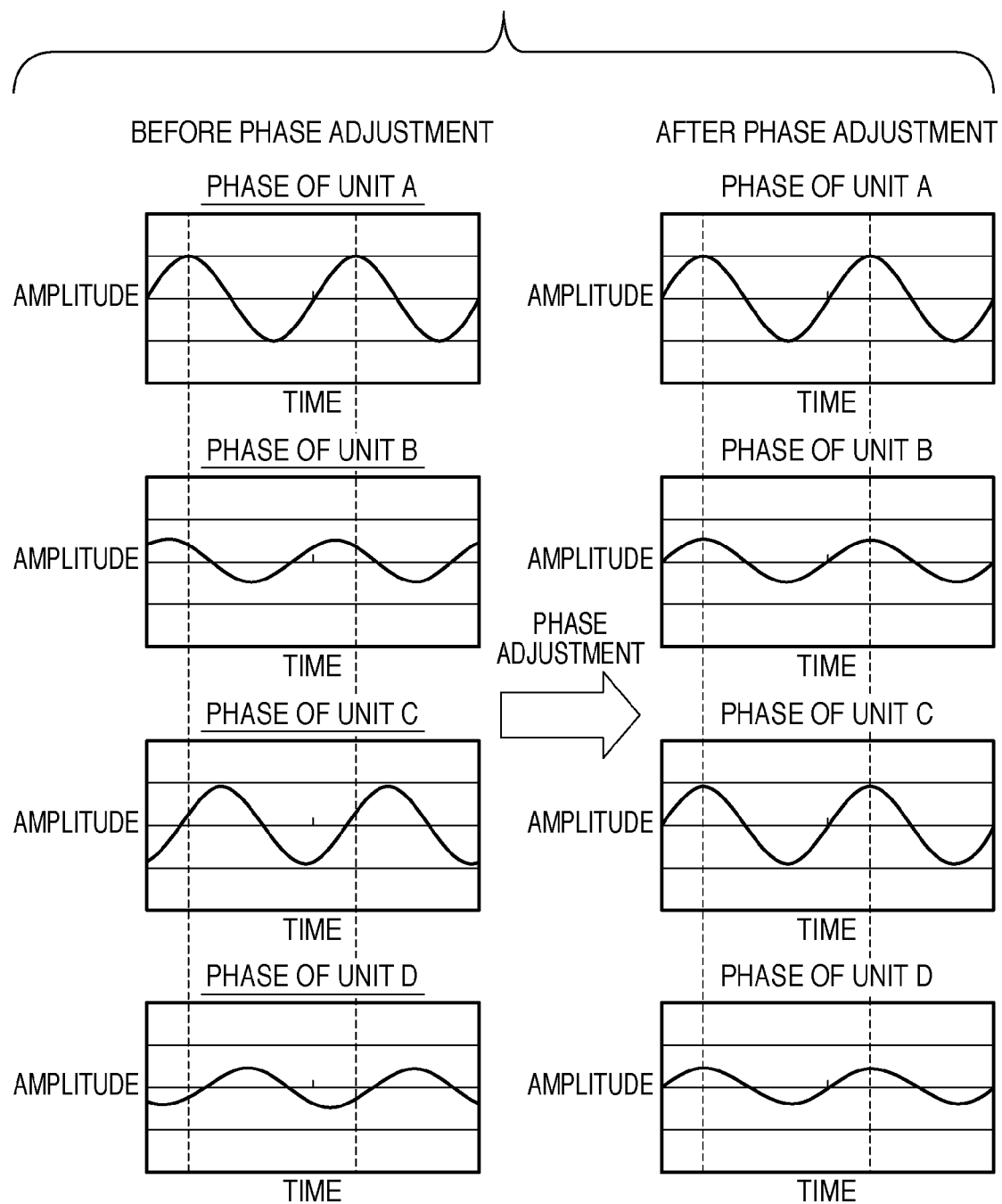
FIG. 2 is a diagram showing examples of a phase prior to adjustment and a phase after adjustment of each scanner motor according to the present embodiment.

FIG. 2 is a diagram showing an example of a phase prior to adjustment and a phase after adjustment of each scanner motor according to the present embodiment. Each of the scanner motors 1a to 1d shown in FIG. 1 start up and rotate individually. Therefore, phases of the jitter on the image differ among each scanner motor 1a to 1d ("before phase adjustment"). In other words, phase differences have occurred among the scanner motors 1a to 1d. The present embodiment reduces these phase differences so that the amount of color misalignment falls within an allowable range. As a result, the relationship of "after phase adjustment" shown in FIG. 2 is maintained. The phase differences are desirably reduced to 0. However, as long as the amount of color misalignment is within the allowable range, the phase differences need not necessarily be 0. In other words, the phase differences need only be controlled so that the color misalignment is within a predetermined range in which the color misalignment does not become an issue. It should be noted that although FIG. 2 shows signal waveforms where only a signal of a specific frequency has been extracted, an actual jitter is made up of a plurality of jitter components respectively having different frequencies, amplitudes, phases, and the like.

Such differences in the phases of long cycle jitter among the respective colors occur because image writing timings differ among the respective colors. Generally, an image forming apparatus causes downstream photoconductive drums to perform exposure at sequentially staggered timings from an upstream photoconductive drum so that the formation positions of the toner images of the respective colors are consistent when multiple transfer (superimposed transfer) is performed. Therefore, in addition to the tandem system shown in FIG. 1, a similar problem will occur in a rotary-system image forming apparatus. With a rotary system, a single photoconductive drum is exposed while performing a number of rotations equivalent to the number of colors (in the case of four colors, the photoconductive drum makes four rotations). The phases for each color lag while a plurality of rotations is performed in this manner.

If phase lag is always constant, it is possible that an initial adjustment shall suffice. However, since, in reality, a rise in the temperature of the image forming apparatus causes a displacement in the irradiating positions on the photoconductive drum, an initial adjustment will not suffice. Therefore, in order to reduce color misalignment in a favorable manner, phases must be adjusted at a predetermined frequency.

Figure 3:
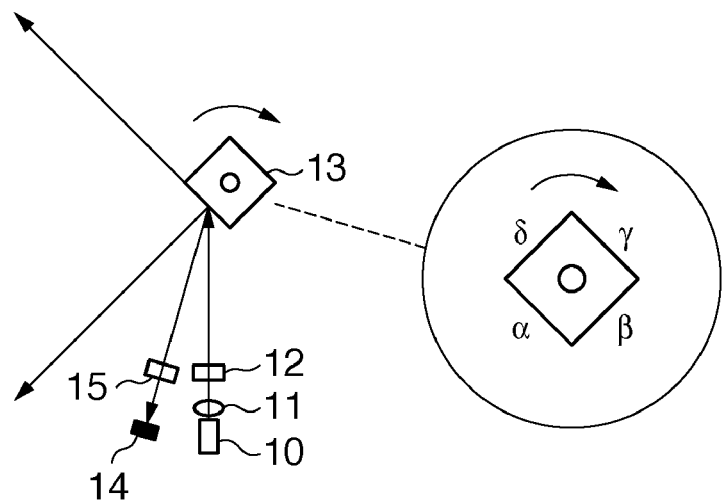
FIG. 3 is an exemplary plan view of a scanning type optical device according to the present embodiment.

FIG. 3 is an exemplary plan view of a scanning type optical device according to the present embodiment. A light emitting unit 10 is a light source such as a semiconductor laser which outputs an optical beam for forming a latent image on a photoconductive drum. A collimating lens 11 converts the optical beam outputted from the light emitting unit 10 into a parallel light. A cylindrical lens 12 causes the optical beam that is now a parallel light to form on a polygonal mirror. A polygonal mirror 13 is an example of a rotating polygonal mirror and is a rotary deflecting element that deflects and scans an incident optical beam. A BD sensor 14 is a light receiving element which generates a scan start signal that is a write reference signal of each scanning line. Incidentally, BD stands for beam detect. An anamorphic lens 15 causes a reflected light from the polygonal mirror 13 to form on the BD sensor 14.

Generally, the polygonal mirror 13 has a regular polygonal shape. However, in reality, manufacturing variations may cause an angle formed by two adjacent reflecting surfaces (mirror surfaces) to slightly deviate from an ideal angle. For example, since the polygonal mirror 13 shown in FIG. 3 has four reflecting surfaces, an angle formed by two adjacent reflecting surfaces should ideally be 90 degrees. However, each angle differs within a tolerance range.

Figure 4:
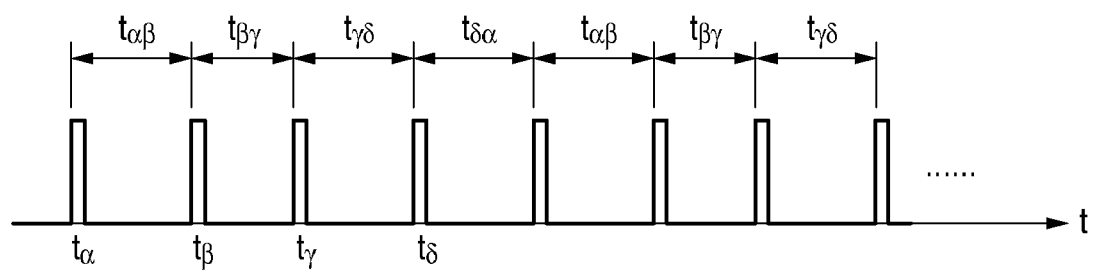
FIG. 4 is a diagram showing an example of a waveform of a detection signal output from a BD sensor when jitters do not exist.

FIG. 4 is a diagram showing an example of a waveform of a detection signal output from a BD sensor when jitters do not exist. In this case, it is assumed that the scanner motors 1a to 1d are rotating at a constant speed. The abscissa represents time. Reference character tα denotes the time at which the BD sensor 14 had output a detection signal upon detecting an optical beam reflected off of a reflecting surface α. Reference character tβ denotes the time at which the BD sensor 14 had output a detection signal upon detecting an optical beam reflected off of a reflecting surface β. In a similar manner, reference characters tγ and tδ respectively correspond to reflecting surfaces γ and δ.

Meanwhile, reference character tαβ denotes a time difference, that is, a time interval between times tα and tβ. FIG. 4 shows that although the timing at which an optical beam is incident to the BD sensor 14 differs for each reflecting surface, the time intervals between detection signals are periodically repeated. While a time interval corresponds to the period of time during which a single reflecting surface deflects and scans light and is therefore sometimes referred to as a deflection period, a time interval shall be hereinafter referred to as a BD interval.

Figure 5:
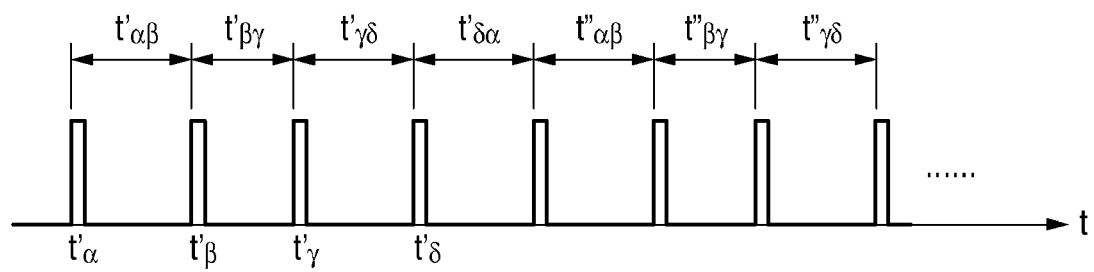
FIG. 5 is a diagram showing an example of a waveform of a detection signal outputted from a BD sensor when a jitter exists.

FIG. 5 is a diagram showing an example of a waveform of a detection signal output from a BD sensor when a jitter exists. As shown in FIG. 5, if a jitter exists, the repeatability of the BD intervals between reflecting surfaces appears to decline. In other words, t'αβ≠t"αβ, t'βγ≠t"βγ, t'γδ≠t"γδ, and t'δα≠t"δα are true. Note that, in FIG. 5, the BD intervals have been exaggerated for simplicity.

[Jitter Component Extracting Method]

FIG. 6 is a diagram showing an example of data of detected BD intervals and a jitter component extraction method according to the present embodiment. As is apparent from the diagram, an optical beam input to the BD sensor 14 includes a signal component that is repeated at a surface period of the polygonal mirror 13, and signal components of other frequencies. A surface period is determined by dividing the period of time required for the polygonal mirror 13 to make one rotation by the number of reflecting surfaces. Therefore, averaging a plurality of units of BD interval data obtained from a same reflecting surface enables calculation of characteristic values of each reflecting surface such as an angle error between adjacent reflecting surfaces and a accuracy of surface of the polygonal mirror 13.

A BD interval obtained from a same reflecting surface refers to, for example, a time difference between a detection timing tαn of an optical beam reflected off of the reflecting surface α during an nth rotation and a detection timing tαn+1 of an optical beam reflected off of the reflecting surface α during an n+1th rotation, where n is a natural number. This time difference shall be referred to as a same-surface BD interval. According to FIG. 4, the same-surface BD interval of the reflecting surface α may be expressed as tαα=tαβ+tβγ+tγδ+tδα.

Moreover, a BD interval between two adjacent reflecting surfaces refers to, for example, a time difference between a detection timing of an optical beam reflected off of the reflecting surface α during an nth rotation and a detection timing of an optical beam reflected off of the reflecting surface β during the nth rotation. This shall be referred to as an inter-adjacent reflecting surface-BD interval. Reference character tαβ or the like shown in FIG. 4 is an example of an inter-adjacent reflecting surface-BD interval.

Signal components attributable to an angle error between adjacent reflecting surfaces or to an accuracy of surface of the polygonal mirror 13 are signal components repeated at the surface period of the polygonal mirror 13. Therefore, these signal components have a frequency equivalent to one rotational period of the scanner motor. Accordingly, from the perspective of a same reflecting surface, these signal components are assumed to be DC components. Meanwhile, other signal components are assumed to be AC components. These facts indicate that the AC components are cancelled by averaging a plurality of units of same-surface BD interval data (sampling value) obtained in regards to a specific reflecting surface. In addition, it is possible to extract only jitter components C by measuring inter-adjacent reflecting surface-BD intervals for the respective reflecting surfaces, calculating an average value B thereof, and subtracting the average value B from the respective units of data A of the measured inter-adjacent reflecting surface-BD intervals.

Note that all time intervals need not necessarily be always sampled. For example, BD intervals may be only sampled for a specific reflecting surface among the four reflecting surfaces. In this case, since the sampling frequency is ¼, a frequency range to be calculated by Fourier transformation is narrowed down to ¼. However, this does not pose a problem since a long cycle jitter belongs to a frequency range lower than the calculated frequency range.

FIG. 7 is a diagram for describing the effects of frequency extraction according to the present embodiment. More precisely, the upper side of FIG. 7 shows a waveform immediately after start-up of a scanner motor. As described above, due to angular errors between reflecting surfaces of the polygonal mirror 13 and to jitter components, variations occur in the waveform of a detection signal outputted from the BD sensor 14. In other words, BD intervals will not be constant.

A characteristic value of each reflecting surface is calculated from the data of such measured BD intervals according to the procedure described above. The characteristic value is primarily made up of a long cycle jitter component as shown in the lower side of FIG. 7. In this manner, a long cycle jitter component can be extracted.

Figure 8:
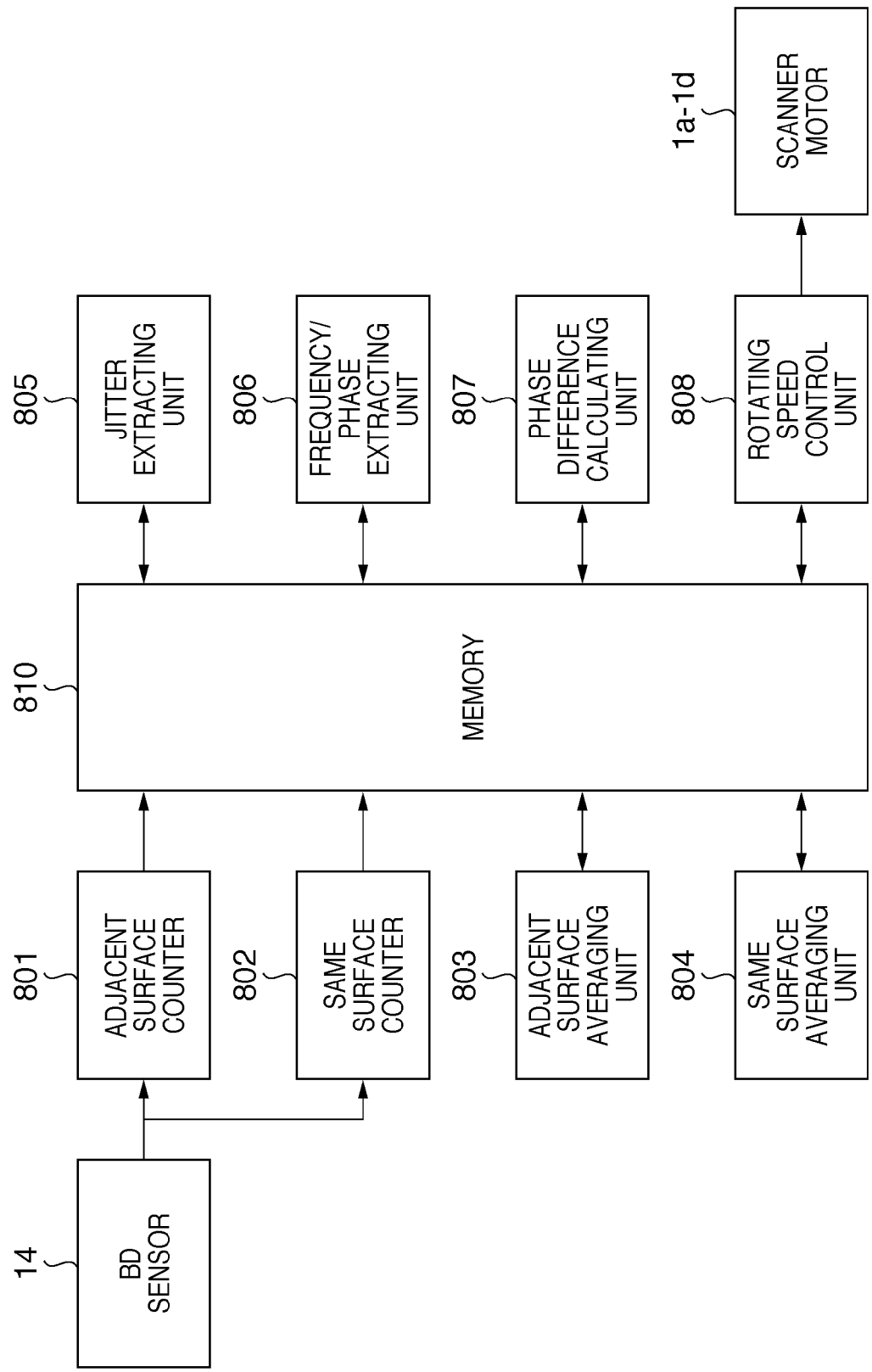
FIG. 8 is a diagram showing an example of a control unit according to the present embodiment.

FIG. 8 is a diagram showing an example of a control unit according to the present embodiment. Hereinafter, a description will be given on an example of a detecting unit that detects a phase of rotating speed unevenness of a rotating polygonal mirror provided at each of the plurality of scanning type optical devices, and an adjusting unit that adjusts the rotating speed of each rotating polygonal mirror so as to reduce the phase differences between the phases detected for each rotating polygonal mirror. Descriptions on sections already described will be omitted by denoting such sections by same reference characters.

An adjacent surface counter 801 is a counter that measures a time interval (adjacent surface BD interval) between two detection signals inputted from the BD sensor 14. When a detection signal is input, a count value at that point is written into a memory 810 as an adjacent surface BD interval and the adjacent surface counter 801 is reset. The BD sensor 14 is an example of a sensing unit that outputs a sensing signal every time an optical beam reflected by each of a plurality of mirror surfaces provided at the rotating polygonal mirror is sensed. In addition, the adjacent surface counter 801 is an example of a specifying unit that specifies a time difference between two adjacent sensing signals outputted from the sensing unit.

A same surface counter 802 is a counter that measures a time interval (same surface BD interval) between two detection signals from a same surface input from the BD sensor 14. When (the number of reflecting surfaces +1) number of detection signals are input, a count value at that point is written into a memory 810 as a same surface BD interval and the same surface counter 802 is reset.

An adjacent surface averaging unit 803 calculates an average value of a plurality of adjacent surface BD intervals written into the memory 810. The adjacent surface averaging unit 803 is an example of a first averaging unit that calculates an average value of time differences between two adjacent sensing signals outputted from the sensing unit. A same surface averaging unit 804 calculates an average value of a plurality of same surface BD intervals written into the memory 810.

The same surface averaging unit 804 is an example of a second averaging unit that calculates an average value of time differences between sensing signals corresponding to the same mirror surface of the rotating polygonal mirror among a plurality of sensing signals output from the sensing unit.

A jitter extracting unit 805 extracts a long cycle jitter component by subtracting a difference between a same surface BD interval average value and an adjacent surface BD interval average value from each measured adjacent surface BD interval. Accordingly, the jitter extracting unit 805 is an example of an extracting unit that extracts a long cycle jitter component by removing, among rotating speed unevenness, a short cycle jitter component attributable to angular errors between adjacent mirror surfaces and to the accuracy of surface of the mirror surfaces. In addition, the jitter extracting unit 805 is an example of a subtracting unit that subtracts a difference between an average value acquired by the first averaging unit and an average value acquired by the second averaging unit from a time difference between two adjacent sensing signals outputted from the sensing unit.

A frequency/phase extracting unit 806 extracts a frequency and a phase of an extracted long cycle jitter component by performing, for example, a Fourier transformation. The frequency/phase extracting unit 806 may also compare the respective amplitudes of extracted frequencies, specify a frequency with a maximum amplitude, and extract a phase only from the specified frequency. Accordingly, the frequency/phase extracting unit 806 is an example of a determining unit that determines a frequency and a phase of a rotating speed unevenness from a plurality of time differences specified by the specifying unit. In a similar manner, the frequency/phase extracting unit 806 is an example of a calculating unit (Fourier transform unit) that performs Fourier transformation on a plurality of time differences to calculate a frequency of rotating speed unevenness.

The BD sensor 14 is provided at each of the scanning type optical devices 100A to 100D. Therefore, the adjacent surface counter 801, the same surface counter 802, the adjacent surface averaging unit 803, the same surface averaging unit 804, the jitter extracting unit 805, and the frequency/phase extracting unit 806 may also be provided for each BD sensor 14. If the respective units are capable of concurrently processing detection signals from a plurality of BD sensors 14, the respective units may be integrated into a single unit.

A phase difference calculating unit 807 calculates phase differences between phases acquired for each of the scanning type optical devices 100A to 100D. For example, the phase difference calculating unit 807 may calculate a phase with respect to a reference signal (e.g., an image write signal or the like) for each scanning type optical device and calculate differences between the calculated phases. A rotating speed control unit 808 adjusts the rotating speed of each polygonal mirror so that each calculated phase difference decreases. Adjustment of the rotating speed of a polygonal mirror 13 is realized by controlling the rotating speed (the number of rotations) of a corresponding scanner motor 1a to 1d. The adjacent surface averaging unit 803, the same surface averaging unit 804, the jitter extracting unit 805, the frequency/phase extracting unit 806, the phase difference calculating unit 807, and the rotating speed control unit 808 may be realized by hardware or software. For example, the respective units can be realized by combining one or more components such as a CPU, an ASIC, a logic circuit, and a computer program.

Figure 9:
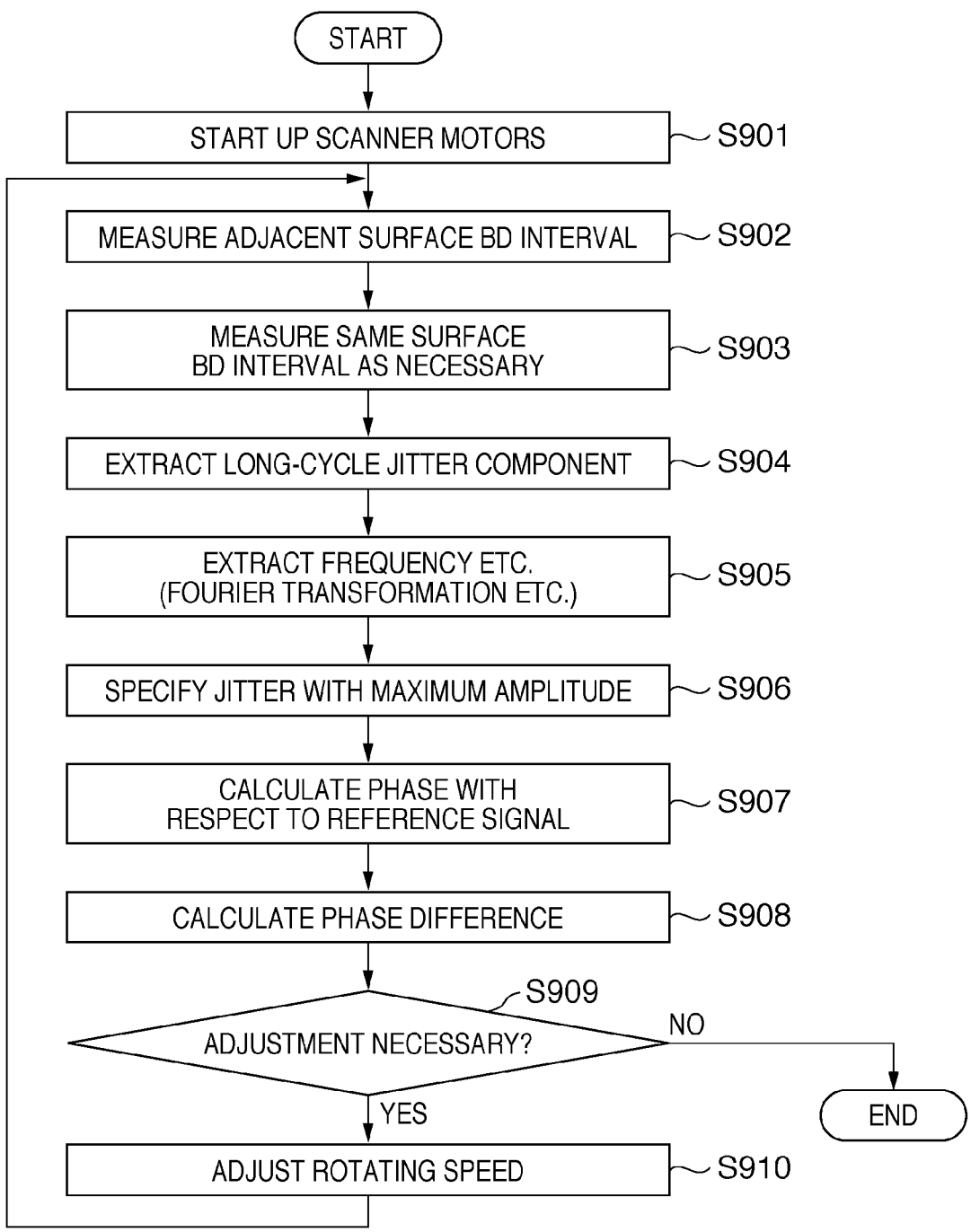
FIG. 9 is a flowchart showing an example of a reduction method of a long cycle jitter component according to the present embodiment.

FIG. 9 is a flowchart showing an example of a reduction method of a long cycle jitter component according to the present embodiment. In step S901, the rotating speed control unit 808 starts up each scanner motor. In step S902, the adjacent surface counter 801 measures adjacent surface BD intervals. In step S903, the same surface counter 802 measures same surface BD intervals. A calculating unit that calculates a same surface BD interval from measured adjacent surface BD intervals may be adopted in place of the same surface counter 802. Note that same surface BD intervals are measured as necessary. This is because, as described above, an angle error between surfaces or an accuracy of surface of a polygonal mirror are characteristic values unique to each reflecting surface and therefore a single acquisition of such data shall suffice.

In step S904, the jitter extracting unit 805 extracts a long cycle jitter component. As described above, the adjacent surface averaging unit 803 and the same surface averaging unit 804 calculate average values of adjacent surface BD intervals and same surface BD intervals. The jitter extracting unit 805 then primarily extracts a long cycle jitter component by subtracting a difference between the average values from each unit of measured data of adjacent BD intervals.

In step S905, the frequency/phase extracting unit 806 performs Fourier transformation on the extracted jitter component in order to extract a plurality of frequencies and phases thereof constituting the jitter component. In step S906, the frequency/phase extracting unit 806 compares the respective amplitudes of the extracted frequencies and specifies a frequency having a maximum amplitude. This is performed because suppressing a jitter component (frequency) with a large amplitude is effective for correcting an image as favorable as possible. Accordingly, the frequency/phase extracting unit 806 is an example of a comparing unit that compares the respective amplitudes of a plurality of frequencies determined by the determining unit.

In step S907, the phase difference calculating unit 807 calculates a phase with respect to a reference signal (e.g., an image write signal or the like) for a jitter component specified as having a maximum amplitude. The phase is calculated for each scanning type optical device or, in other words, for each polygonal mirror. The reference signal may also be a jitter component extracted for any one of the other polygonal mirrors. This is because, ultimately, a reduction in the phase differences between jitter components of the respective polygonal mirrors shall suffice. In other words, a color misalignment does not occur if the jitter phases of the respective colors are the same on an image.

In step S908, the phase difference calculating unit 807 calculates a difference between the calculated phases of the respective polygonal mirrors or, in other words, calculates a phase difference. In step S909, the rotating speed control unit 808 determines whether an adjustment of rotating speed is necessary based on the calculated phase difference. For example, the rotating speed control unit 808 may determine whether the calculated phase difference exceeds a predetermined threshold. The predetermined threshold is determined so that the amount of color misalignment falls within allowable limits. If the rotating speed does not require adjustment, the present processing is concluded. If the rotating speed requires adjustment, the processing proceeds to step S910.

In step S910, the rotating speed control unit 808 adjusts the rotating speed of a scanner motor corresponding to the polygonal mirror whose rotating speed requires adjustment. The width of rotating speed adjustment may be a predetermined width or a width proportional to the calculated phase difference. Once rotating speed adjustment is completed, the processing returns to step S902. Accordingly, the rotating speed control unit 808 is an example of a unit that adjusts, for a phase of a frequency with a maximum amplitude as determined based on the comparison result by the comparing unit, the rotating speed of each rotating polygonal mirror so that phase differences between phases detected for each rotating polygonal mirror decrease.

As described above, according to the present embodiment, the amount of color misalignment can be reduced by adjusting the rotating speed of each polygonal mirror so that the phase differences of jitters of the respective polygonal mirrors decrease. For example, a jitter can be extracted by measuring a time difference between sensing signals output for each reflecting surface (mirror surface) and determining a frequency and a phase from the measured time difference. Generally, since the BD sensor 14 is mounted on a scanning type optical device or an image forming apparatus, there is an advantage that a jitter can be extracted without having to provide an additional sensor. For example, by using Fourier transformation, amplitudes, frequencies, phases and the like of various jitter components can be calculated relatively easily. In addition, for a phase of a frequency having a maximum amplitude, the rotating speed of each rotating polygonal mirror is desirably adjusted so that the phase differences between the respective rotating polygonal mirrors decrease. This is because a jitter component with a maximum amplitude also has a maximum effect on color misalignment.

In the present embodiment, in order to reduce phase difference, the air current around a portion of scanner motors is varied by accelerating or decelerating the scanner motors. Accordingly, the phase of a jitter component can be varied in comparison to the air current around a scanner motor that exposes other photoconductive drums.

Figure 10:
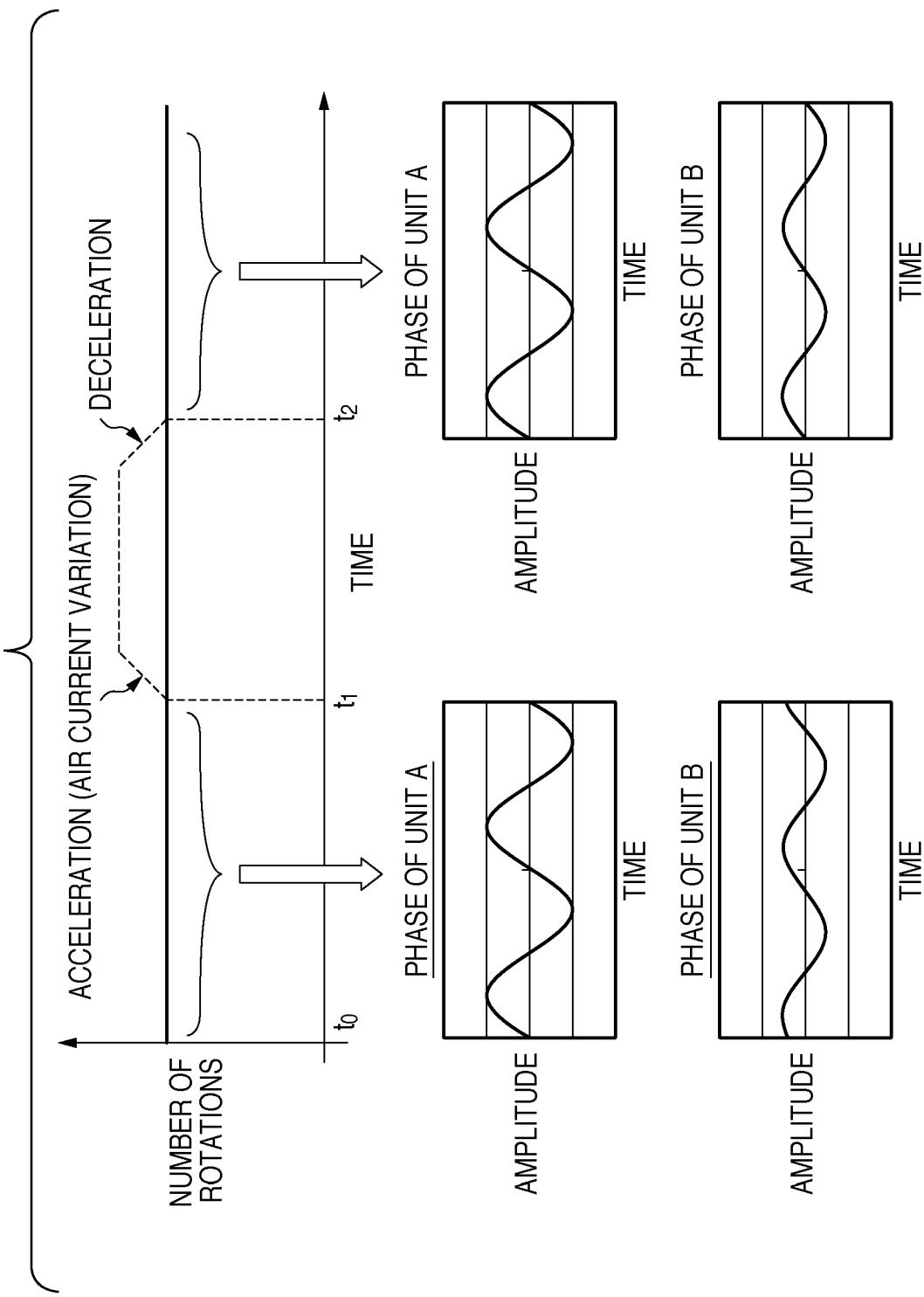
FIG. 10 is a diagram showing an example of an operation performed by the scanner motor for varying phases of a jitter component according to the present embodiment.

FIG. 10 is a diagram showing an example of an operation by a scanner motor for varying a phase of a jitter component according to the present embodiment. In this case, only two scanner motors are shown for simplicity.

As shown in FIG. 10, in an interval from reference character t0 to t1, the numbers of rotations of the two scanner motors are consistent. However, in an interval from reference character t1 to t2, in order to conform the phases of the jitter component, the number of rotations of one scanner motor (dashed line) has been increased over the number of rotations of the other scanner motor (solid line). Subsequently, in the interval from reference character t1 to t2, the original number of rotations of the two scanner motors has been restored.

Note that the acceleration/deceleration operation is desirably performed between immediately after start-up of the scanner motors and before the start of image formation, instead of during image formation. This is to avoid affecting the image.

In addition, a correlation between phase difference and the time or speed of acceleration/deceleration may be measured in advance and stored in the memory 810. In this case, control time is likely reduced in comparison with a method in which control is performed in increments of a predetermined width.

While the flowchart described above has focused solely on a jitter component having a maximum amplitude, the present invention need not be limited thereto. Frequencies having the second and third largest amplitudes may also be included as suppression objects provided that such frequencies affect color misalignment. In other words, the aforementioned rotating speed control may be executed for a plurality of high-ranking frequencies when amplitudes are compared.

In addition, with an image forming apparatus mounted with a plurality of scanner motors, phase control for maintaining optimal scanning line positions (write timing) for each color may be used in order to favorably reduce color misalignment in a vertical scanning direction. This phase control particularly achieves maximum effect when the number of photoconductive drums equals the number of scanner motors. In other words, the phase control is a technique for controlling the write timing of the scanner motor of each color so that the formation positions of scanning lines of the respective colors on the image are consistent. In contrast, since the present embodiment is intended to suppress a long cycle jitter component, the present embodiment is able to also satisfy phase control for color misalignment in the vertical scanning direction.

Furthermore, in an image forming apparatus where a scanner motor is suspended upon completion of an image forming job, the start-up time of a scanner motor may be delayed by a delay time corresponding to a set phase difference. The phase difference or the corresponding delay time may, for example, be stored in the memory 810.

As for phase difference, the angle at which maximum effect is achieved is 0 degree. However, there are cases where 0 degree is not necessarily achieved when another control such as described above is concurrently performed. When combining signals with the same amplitude and the same frequency, a condition for invariably causing the amplitude to be lower than the original amplitude is that the phase difference equals or falls below 60 degrees. In addition, when combining signals with different amplitudes and the same frequency, the condition for invariably causing the amplitude to be lower than the original amplitude is also that the phase difference equals or falls below 60 degrees. Therefore, by controlling rotating speed so that the phase difference is 60 degrees or lower, long cycle jitters can invariably be improved as compared to an initial state. In other words, the phase difference need only be within ±60 degrees (−60 degrees≦phase difference≦+60 degrees). Accordingly, the rotating speed control unit may adjust the rotating speed of each rotating polygonal mirror so that an absolute value of the phase difference becomes equal to or less than 60 degrees.

The flowchart illustrated in FIG. 9 is merely an example. Therefore, as long as technical ideas that are the same or similar to those of the present invention are adopted and similar effects are produced, a different flow may be adopted.

Moreover, as an added function of the image forming apparatus, a phase difference of each polygonal mirror may be set while verifying an image to be actually outputted by the image forming apparatus. For example, a test image may be output for each of a plurality of phase difference combinations, whereby the control unit selects a phase difference combination corresponding to a favorable test image. For example, if an image indicating set value has been formed along with a test image, an operator can know the set value form the image and input the set value from an operating unit. Needless to say, a test image for each of a plurality of phase difference combinations may be read by an image reading apparatus, whereby, by calculating an amount of color misalignment for each test image, a suitable phase difference combination is determined.

In addition, while a case having four scanner motors has been described as an example, the number of scanner motors need not necessarily be four as long as there is more than one. The same applies to optical layouts and configurations inside the image forming apparatus, and the exemplified configuration need not be adopted. Furthermore, the number of photoconductive drums of the image forming unit also need not necessarily be four. Moreover, the numbers of scanner motors and photoconductive drums need not necessarily be the same as long as there are pluralities of both scanner motors and photoconductive drums. For example, with an image forming apparatus having fewer scanner motors than photoconductive drums, image degradation can be minimized by performing control so as to correct color misalignments in colors with high brightness such as black, cyan, and the like whose color misalignments tend to be more conspicuous. Accordingly, one or more scanning type optical devices among the plurality of scanning type optical devices may be arranged so as to irradiate an optical beam towards a plurality of image carrier bodies.

According to the present invention, with an image forming apparatus that performs image forming using a plurality of scanner motors, an amount of color misalignment attributable to a long cycle jitter can be reduced while keeping air current variations, control residuals, and accuracy of surface of the polygonal mirrors at levels similar to conventional levels.

Other Embodiments

Figure 11:
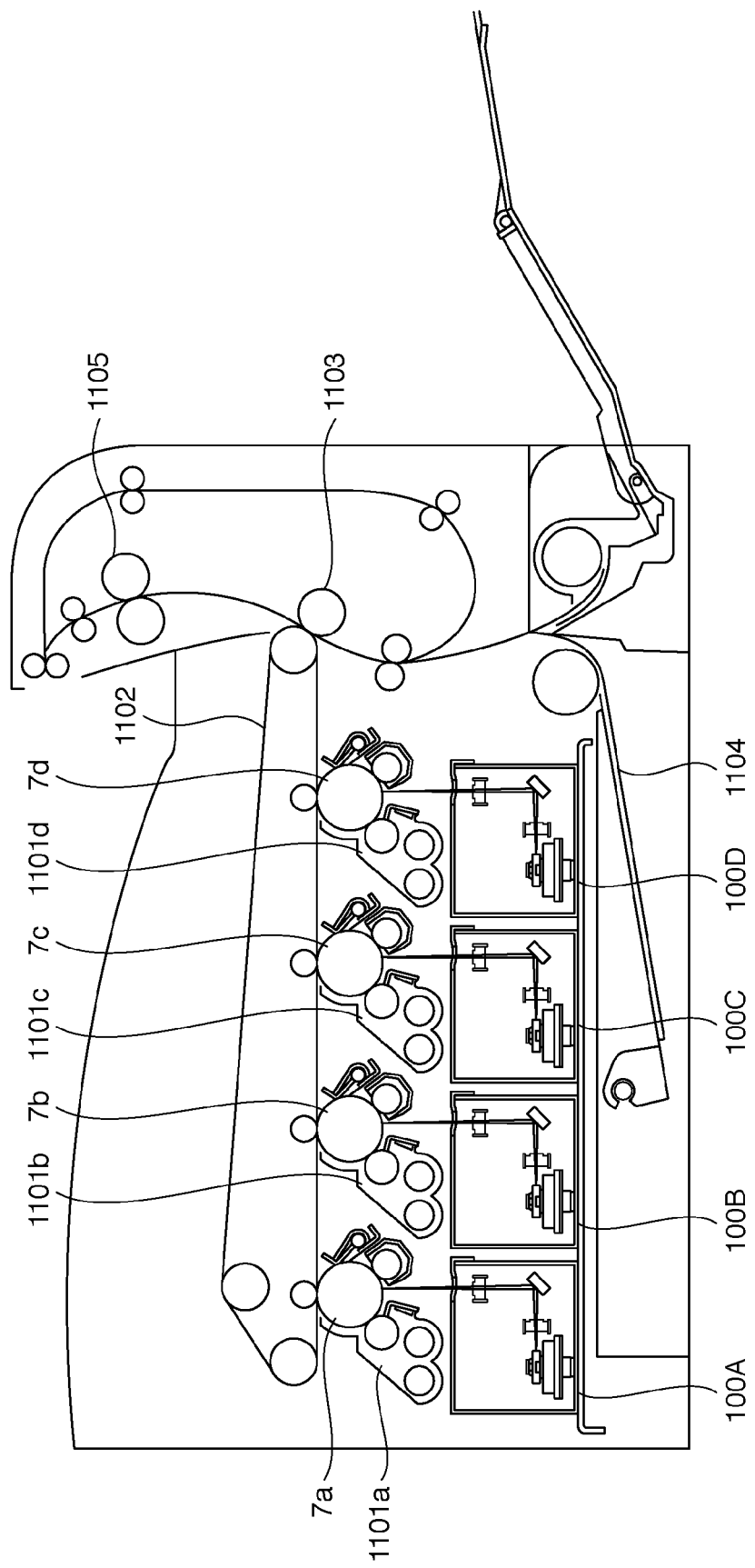
FIG. 11 is a diagram showing an example of an image forming apparatus according to another embodiment.
Figure 12:
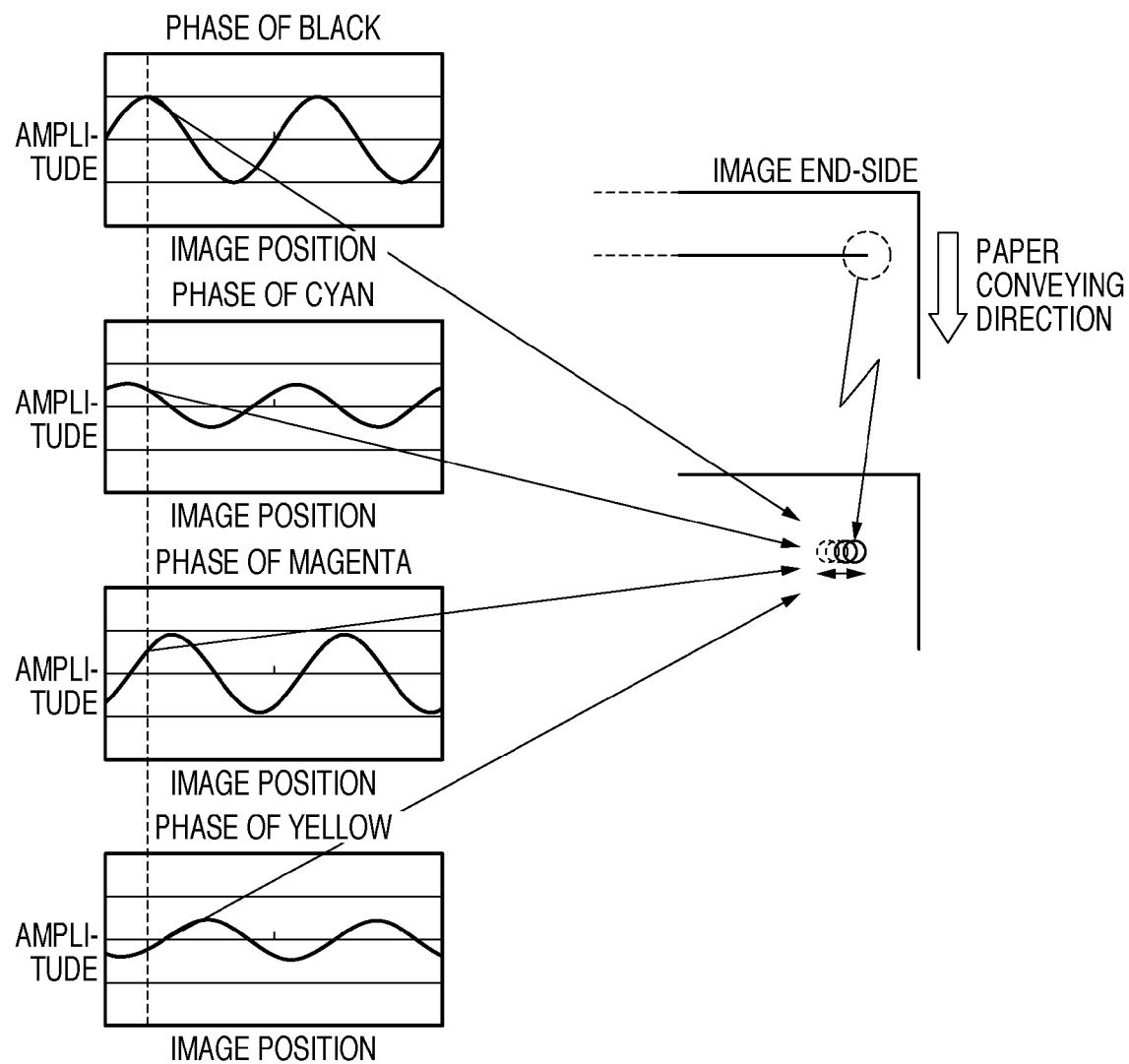
FIG. 12 is a diagram for describing the relationship between a signal waveform of a jitter component having a relatively large amplitude among jitters of a scanner motor and a color misalignment in a main scanning direction.

FIG. 11 is a diagram showing an example of an image forming apparatus according to another embodiment. The image forming apparatus may be realized as, for example, a printing apparatus, a printer, a copier, a multifunctional machine, or a facsimile. As described above, the image forming apparatus is provided with independent photoconductive drums 7a to 7d corresponding to the respective colors of yellow, magenta, cyan, and black. In correspondence thereto, scanning type optical devices 100A to 100D which irradiate a laser light based on image information are provided. Accordingly, latent images are respectively formed on the photoconductive drums 7a to 7d.

Developing devices 1101a to 1101d develop latent images using developers (e.g., toner) corresponding to yellow, magenta, cyan, and black to form developer images. Developer images held by the photoconductive drums 7a to 7d are primary-transferred in sequence to an intermediate transfer body 1102. In other words, at this stage, a large number of developer images with different colors are primary-transferred while being aligned. In addition, at a secondary transfer device 1103, the developer images are secondary-transferred onto paper fed from a paper cassette 1104. Paper may also be referred to as, for example, recording material, a recording medium, a sheet, transfer material, or a transfer paper. Finally, at a fixing device 1105, the developer images are heated and pressurized to be fixed onto the paper.

Since the aforementioned long cycle jitter component is reduced, the amount of color misalignment of an image formed by an image forming apparatus is also reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-313941, filed Dec. 4, 2007, which is hereby incorporated by reference herein in its entirety.

What is claimed is:

1. An image forming apparatus that performs multi-color image formation, comprising:
a plurality of scanning type optical devices which respectively deflect and scan an optical beam using a rotating polygonal mirror;
a detecting unit which detects a phase of rotating speed unevenness of said rotating polygonal mirror respectively provided at said plurality of scanning type optical devices; and
an adjusting unit which adjusts, based on a phase of rotating speed unevenness detected for said each rotating polygonal mirror by said detecting unit, the rotating speed of each rotating polygonal mirror to reduce the phase differences between the phases, wherein said detecting unit includes:
a sensing unit which outputs a sensing signal every time an optical beam reflected by each of a plurality of mirror surfaces provided at said rotating polygonal mirrors is sensed;
a specifying unit which specifies a time difference between two adjacent sensing signals outputted from said sensing unit; and
a determining unit which determines a frequency of the rotating speed unevenness from a plurality of time differences specified by said specifying unit and determines a phase from the determined frequency.

2. The image forming apparatus according to claim 1, wherein said determining unit includes
a calculating unit which calculates a frequency of the rotating speed unevenness by performing Fourier transformation on the plurality of time differences.

3. The image forming apparatus according to claim 1, wherein
said determining unit includes a comparing unit which compares respective amplitudes of the plurality of frequencies determined by said determining unit, and
said adjusting unit adjusts, for a phase of a frequency for which amplitude becomes maximum based on comparison results by said comparing unit, the rotating speed of each rotating polygonal mirror to reduce the phase differences.

4. The image forming apparatus according to claim 1, wherein said determining unit includes
an extracting unit which removes short cycle jitter components attributable to an angle error between two adjacent reflecting surfaces or a accuracy of surface of a mirror surface in said rotating polygonal mirror among the rotating speed unevenness, and extracts a long cycle jitter component.

5. The image forming apparatus according to claim 4, wherein said extracting unit includes:
a first averaging unit which calculates an average value of a time difference between two adjacent sensing signals outputted from said sensing unit;
a second averaging unit which calculates an average value of a time difference between sensing signals corresponding to a same mirror surface of said rotating polygonal mirror among a plurality of sensing signals outputted from said sensing unit; and
a subtracting unit which calculates a difference between an average value acquired by said first averaging unit and an average value acquired by said second averaging unit, and subtracts the difference from the time difference between two adjacent sensing signals outputted from said sensing unit.

6. The image forming apparatus according to claim 1, wherein
said adjusting unit adjusts the rotating speed of each rotating polygonal mirror so that an absolute value of the phase difference equals or falls under 60 degrees.

7. The image forming apparatus according to claim 1, wherein
one or more scanning type optical devices among said plurality of scanning type optical devices irradiates an optical beam towards a plurality of image carrier bodies.

8. A control method of an image forming apparatus which performs multi-color image formation using a plurality of scanning type optical devices which deflect and scan an optical beam with a rotating polygonal mirror, said control method comprising:
a detecting step for detecting a phase of rotating speed unevenness of said rotating polygonal mirror respectively provided at said plurality of scanning type optical devices; and
an adjusting step for adjusting, based on a phase of rotating speed unevenness detected for said each rotating polygonal mirror by said detecting unit, the rotating speed of each rotating polygonal mirror to reduce the phase differences between the phases, wherein said detecting step includes:
a sensing step for outputting a sensing signal every time an optical beam reflected by each of a plurality of mirror surfaces provided at said rotating polygonal mirrors is sensed;
a specifying step for specifying a time difference between two adjacent sensing signals outputted in said sensing step; and
a determining step for determining a frequency of the rotating speed unevenness from a plurality of time differences specified in said specifying step and for determining a phase from the determined frequency.

9. The control method according to claim 8, wherein said determining step includes
a calculating step for calculating a frequency of the rotating speed unevenness by performing Fourier transformation on the plurality of time differences.

10. The control method according to claim 8, wherein said determining step includes a comparing step for comparing respective amplitudes of the plurality of frequencies determined in said determining step, and
said adjusting step for adjusting, for a phase of a frequency for which amplitude becomes maximum based on comparison results in said comparing step, the rotating speed of each rotating polygonal mirror to reduce the phase differences.

11. The control method according to claim 8, wherein said determining step includes
an extracting step for removing short cycle jitter components attributable to an angle error between two adjacent reflecting surfaces or a accuracy of surface of a mirror surface in said rotating polygonal mirror among the rotating speed unevenness, and extracting a long cycle jitter component.

12. The control method according to claim 11, wherein said extracting step includes:
a first averaging step for calculates an average value of a time difference between two adjacent sensing signals outputted in said sensing step;
a second averaging step for calculating an average value of a time difference between sensing signals corresponding to a same mirror surface of said rotating polygonal mirror among a plurality of sensing signals outputted in said sensing step; and
a subtracting step for calculating a difference between an average value acquired in said first averaging step and an average value acquired in said second averaging step, and for subtracting the difference from the time difference between two adjacent sensing signals outputted in said sensing step.

13. The control method according to claim 8, wherein said adjusting step including a step of adjusting the rotating speed of each rotating polygonal mirror so that an absolute value of the phase difference equals or falls under 60 degrees.

14. The control method according to claim 8, wherein one or more scanning type optical devices among said plurality of scanning type optical devices irradiates an optical beam towards a plurality of image carrier bodies.

15. An optical system comprising a plurality of scanning type optical devices which deflect and scan an optical beam using a rotating polygonal mirror, said optical system further comprising;
a detecting unit which detects a phase of rotating speed unevenness of said rotating polygonal mirror respectively provided at said plurality of scanning type optical devices; and
an adjusting unit which adjusts the rotating speed of said each rotating polygonal mirror to reduce the phase difference between the phases detected for said each rotating polygonal mirror,
wherein said detecting unit includes:
a sensing unit which outputs a sensing signal every time an optical beam reflected by each of a plurality of mirror surfaces provided at said rotating polygonal mirrors is sensed;
a specifying unit which specifies a time difference between two adjacent sensing signals outputted from said sensing unit; and
a determining unit which determines a frequency of the rotating speed unevenness from a plurality of time differences specified by said specifying unit and determines a phase from the determined frequency.

16. The optical system according to claim 15, wherein said determining unit includes
a calculating unit which calculates a frequency of the rotating speed unevenness by performing Fourier transformation on the plurality of time differences.

17. The optical system according to claim 15, wherein said determining unit includes a comparing unit which compares respective amplitudes of the plurality of frequencies determined by said determining unit, and
said adjusting unit adjusts, for a phase of a frequency for which amplitude becomes maximum based on comparison results by said comparing unit, the rotating speed of each rotating polygonal mirror to reduce the phase differences.

18. The optical system according to claim 15, wherein said determining unit includes
an extracting unit which removes short cycle jitter components attributable to an angle error between two adjacent reflecting surfaces or a accuracy of surface of a mirror surface in said rotating polygonal mirror among the rotating speed unevenness, and extracts a long cycle jitter component.

19. The optical system according to claim 18, wherein said extracting unit includes:
a first averaging unit which calculates an average value of a time difference between two adjacent sensing signals outputted from said sensing unit;
a second averaging unit which calculates an average value of a time difference between sensing signals corresponding to a same mirror surface of said rotating polygonal mirror among a plurality of sensing signals outputted from said sensing unit; and
a subtracting unit which calculates a difference between an average value acquired by said first averaging unit and an average value acquired by said second averaging unit, and subtracts the difference from the time difference between two adjacent sensing signals outputted from said sensing unit.

20. The optical system according to claim 15, wherein said adjusting unit adjusts the rotating speed of each rotating polygonal mirror so that an absolute value of the phase difference equals or falls under 60 degrees.

21. The optical system according to claim 15, wherein one or more scanning type optical devices among said plurality of scanning type optical devices irradiates an optical beam towards a plurality of image carrier bodies.

* * * * *